(12) United States Patent
Kaiser et al.

(10) Patent No.: US 9,361,914 B1
(45) Date of Patent: Jun. 7, 2016

(54) MAGNETIC SENSOR WITH THIN CAPPING LAYER

(71) Applicant: Western Digital (Fremont), LLC, Fremont, CA (US)

(72) Inventors: Christian Kaiser, San Jose, CA (US); Qunwen Leng, Palo Alto, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/308,421

(22) Filed: Jun. 18, 2014

(51) Int. Cl.
*G11B 5/39* (2006.01)
*G11B 5/31* (2006.01)

(52) U.S. Cl.
CPC .............. *G11B 5/39* (2013.01); *G11B 5/3903* (2013.01); *G11B 5/3116* (2013.01); *G11B 5/3912* (2013.01); *G11B 5/3929* (2013.01)

(58) Field of Classification Search
USPC .................................. 360/319, 324.1, 324.12
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |

(Continued)

*Primary Examiner* — Carlos E Garcia (57) ABSTRACT

A magnetic sensor for use in a data storage device is described. The magnetic sensor includes a composite layer comprising a free layer portion and a bias layer portion each comprising a magnetic material, a shield layer comprising a magnetic material, and a continuous spacer layer comprising a non-magnetic material, the spacer layer separating the shield layer from the composite layer such that the magnetic coupling between the shield layer and the bias layer portion is stronger than the magnetic coupling between the shield layer and the free layer portion. A disk drive comprising a rotatable magnetic recording disk and the slider including the magnetic sensor arranged with the magnetic recording disk is also described.

30 Claims, 4 Drawing Sheets

(56) References Cited

U.S. PATENT DOCUMENTS

| | | |
|---|---|---|
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,268,985 B1 | 7/2001 | Pinarbasi |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |

(56) References Cited

U.S. PATENT DOCUMENTS

| | | |
|---|---|---|
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |

(56) References Cited

U.S. PATENT DOCUMENTS

| | | |
|---|---|---|
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,218,270 B1 | 7/2012 | Zeltser et al. |
| 8,220,140 B1 | 7/2012 | Wang et al. |
| 8,222,599 B1 | 7/2012 | Chien |
| 8,225,488 B1 | 7/2012 | Zhang et al. |
| 8,225,489 B2 * | 7/2012 | Miyauchi et al. .......... 29/603.16 |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,305,715 B2 * | 11/2012 | Mauri et al. .................. 360/319 |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,395,867 B2 | 3/2013 | Dimitrov et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |

(56) References Cited

U.S. PATENT DOCUMENTS

| | | | |
|---|---|---|---|
| 8,468,682 | B1 | 6/2013 | Zhang |
| 8,472,288 | B1 | 6/2013 | Wolf et al. |
| 8,480,911 | B1 | 7/2013 | Osugi et al. |
| 8,486,285 | B2 | 7/2013 | Zhou et al. |
| 8,486,286 | B1 | 7/2013 | Gao et al. |
| 8,488,272 | B1 | 7/2013 | Tran et al. |
| 8,490,279 | B2 | 7/2013 | Zhou et al. |
| 8,491,801 | B1 | 7/2013 | Tanner et al. |
| 8,491,802 | B1 | 7/2013 | Gao et al. |
| 8,493,693 | B1 | 7/2013 | Zheng et al. |
| 8,493,695 | B1 | 7/2013 | Kaiser et al. |
| 8,495,813 | B1 | 7/2013 | Hu et al. |
| 8,498,084 | B1 * | 7/2013 | Leng et al. .......... 360/324.2 |
| 8,506,828 | B1 | 8/2013 | Osugi et al. |
| 8,514,517 | B1 | 8/2013 | Batra et al. |
| 8,518,279 | B1 | 8/2013 | Wang et al. |
| 8,518,832 | B1 | 8/2013 | Yang et al. |
| 8,520,336 | B1 | 8/2013 | Liu et al. |
| 8,520,337 | B1 | 8/2013 | Liu et al. |
| 8,524,068 | B2 | 9/2013 | Medina et al. |
| 8,526,275 | B1 | 9/2013 | Yuan et al. |
| 8,531,801 | B1 | 9/2013 | Xiao et al. |
| 8,532,450 | B1 | 9/2013 | Wang et al. |
| 8,533,937 | B1 | 9/2013 | Wang et al. |
| 8,537,494 | B1 | 9/2013 | Pan et al. |
| 8,537,495 | B1 | 9/2013 | Luo et al. |
| 8,537,502 | B1 | 9/2013 | Park et al. |
| 8,545,999 | B1 | 10/2013 | Leng et al. |
| 8,547,659 | B1 | 10/2013 | Bai et al. |
| 8,547,667 | B1 | 10/2013 | Roy et al. |
| 8,547,730 | B1 | 10/2013 | Shen et al. |
| 8,555,486 | B1 | 10/2013 | Medina et al. |
| 8,559,141 | B1 | 10/2013 | Pakala et al. |
| 8,563,146 | B1 | 10/2013 | Zhang et al. |
| 8,565,049 | B1 | 10/2013 | Tanner et al. |
| 8,568,602 | B2 | 10/2013 | Sakamoto et al. |
| 8,576,517 | B1 | 11/2013 | Tran et al. |
| 8,578,594 | B2 | 11/2013 | Jiang et al. |
| 8,582,238 | B1 | 11/2013 | Liu et al. |
| 8,582,241 | B1 | 11/2013 | Yu et al. |
| 8,582,253 | B1 | 11/2013 | Zheng et al. |
| 8,588,039 | B1 | 11/2013 | Shi et al. |
| 8,593,914 | B2 | 11/2013 | Wang et al. |
| 8,597,528 | B1 | 12/2013 | Roy et al. |
| 8,599,520 | B1 | 12/2013 | Liu et al. |
| 8,599,657 | B1 | 12/2013 | Lee |
| 8,603,593 | B1 | 12/2013 | Roy et al. |
| 8,607,438 | B1 | 12/2013 | Gao et al. |
| 8,607,439 | B1 | 12/2013 | Wang et al. |
| 8,611,035 | B1 | 12/2013 | Bajikar et al. |
| 8,611,054 | B1 | 12/2013 | Shang et al. |
| 8,611,055 | B1 | 12/2013 | Pakala et al. |
| 8,614,864 | B1 | 12/2013 | Hong et al. |
| 8,619,512 | B1 | 12/2013 | Yuan et al. |
| 8,625,233 | B1 | 1/2014 | Ji et al. |
| 8,625,941 | B1 | 1/2014 | Shi et al. |
| 8,628,672 | B1 | 1/2014 | Si et al. |
| 8,630,068 | B1 | 1/2014 | Mauri et al. |
| 8,634,280 | B1 | 1/2014 | Wang et al. |
| 8,638,529 | B1 | 1/2014 | Leng et al. |
| 8,643,980 | B1 | 2/2014 | Fowler et al. |
| 8,649,123 | B1 | 2/2014 | Zhang et al. |
| 8,665,561 | B1 | 3/2014 | Knutson et al. |
| 8,670,211 | B1 | 3/2014 | Sun et al. |
| 8,670,213 | B1 | 3/2014 | Zeng et al. |
| 8,670,214 | B1 | 3/2014 | Knutson et al. |
| 8,670,294 | B1 | 3/2014 | Shi et al. |
| 8,670,295 | B1 | 3/2014 | Hu et al. |
| 8,675,318 | B1 | 3/2014 | Ho et al. |
| 8,675,455 | B1 | 3/2014 | Krichevsky et al. |
| 8,681,594 | B1 | 3/2014 | Shi et al. |
| 8,689,430 | B1 | 4/2014 | Chen et al. |
| 8,693,141 | B1 | 4/2014 | Elliott et al. |
| 8,703,397 | B1 | 4/2014 | Zeng et al. |
| 8,705,205 | B1 | 4/2014 | Li et al. |
| 8,711,518 | B1 | 4/2014 | Zeng et al. |
| 8,711,528 | B1 | 4/2014 | Xiao et al. |
| 8,717,709 | B1 | 5/2014 | Shi et al. |
| 8,720,044 | B1 | 5/2014 | Tran et al. |
| 8,721,902 | B1 | 5/2014 | Wang et al. |
| 8,724,259 | B1 | 5/2014 | Liu et al. |
| 8,749,790 | B1 | 6/2014 | Tanner et al. |
| 8,749,920 | B1 | 6/2014 | Knutson et al. |
| 8,753,903 | B1 | 6/2014 | Tanner et al. |
| 8,760,807 | B1 | 6/2014 | Zhang et al. |
| 8,760,818 | B1 | 6/2014 | Diao et al. |
| 8,760,819 | B1 | 6/2014 | Liu et al. |
| 8,760,822 | B1 | 6/2014 | Li et al. |
| 8,760,823 | B1 | 6/2014 | Chen et al. |
| 8,763,235 | B1 | 7/2014 | Wang et al. |
| 8,780,498 | B1 | 7/2014 | Jiang et al. |
| 8,780,505 | B1 | 7/2014 | Xiao |
| 8,786,983 | B1 | 7/2014 | Liu et al. |
| 8,790,524 | B1 | 7/2014 | Luo et al. |
| 8,790,527 | B1 | 7/2014 | Luo et al. |
| 8,792,208 | B1 | 7/2014 | Liu et al. |
| 8,792,312 | B1 | 7/2014 | Wang et al. |
| 8,793,866 | B1 | 8/2014 | Zhang et al. |
| 8,797,680 | B1 | 8/2014 | Luo et al. |
| 8,797,684 | B1 | 8/2014 | Tran et al. |
| 8,797,686 | B1 | 8/2014 | Bai et al. |
| 8,797,692 | B1 | 8/2014 | Guo et al. |
| 8,813,324 | B2 | 8/2014 | Emley et al. |
| 2004/0252417 | A1 * | 12/2004 | Hasegawa et al. ....... 360/324.11 |
| 2005/0219772 | A1 * | 10/2005 | Hayashi et al. ............ 360/324.2 |
| 2008/0253037 | A1 * | 10/2008 | Kagami et al. ................ 360/324 |
| 2009/0161268 | A1 | 6/2009 | Lin |
| 2009/0229111 | A1 * | 9/2009 | Zhao et al. ................. 29/603.08 |
| 2010/0290157 | A1 | 11/2010 | Zhang et al. |
| 2011/0014390 | A1 * | 1/2011 | Zhou et al. .................... 427/547 |
| 2011/0086240 | A1 | 4/2011 | Xiang et al. |
| 2011/0232079 | A1 * | 9/2011 | Miyauchi et al. .......... 29/603.07 |
| 2012/0111826 | A1 | 5/2012 | Chen et al. |
| 2012/0216378 | A1 | 8/2012 | Emley et al. |
| 2012/0237878 | A1 | 9/2012 | Zeng et al. |
| 2012/0298621 | A1 | 11/2012 | Gao |
| 2013/0216702 | A1 | 8/2013 | Kaiser et al. |
| 2013/0216863 | A1 | 8/2013 | Li et al. |
| 2013/0257421 | A1 | 10/2013 | Shang et al. |
| 2014/0153138 | A1 * | 6/2014 | Le et al. ........................ 360/294 |
| 2014/0154529 | A1 | 6/2014 | Yang et al. |
| 2014/0175050 | A1 | 6/2014 | Zhang et al. |

* cited by examiner

MAGNETIC SENSOR WITH THIN CAPPING LAYER

BACKGROUND

A magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least a coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A sensor such as a Giant Magnetoresistive (GMR) sensor, or a Tunnel Junction Magnetoresistive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

A sensor also includes a spacer layer formed at the top of the sensor stack, which is usually formed on top of the free layer. This spacer layer, which can be constructed of a material such as Ta, protects the free layer during various manufacturing processes, such as high temperature annealing that is used to pin the magnetization of the pinned layer structure.

One of the parameters that affects the overall performance of a sensor is the volume of the free layer. The space required by the spacer layer inhibits the available volume of the free layer at a fixed shield to shield distance.

Thus, there is a need in the art for a magnetic sensor in which more volume is available for the free layer.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION OF THE EMBODIMENTS

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

As used herein, the term "about" followed by a numeric value means that the value may deviate in accordance with engineering or manufacturing processes and/or tolerances In the following detailed description, various aspects of the present invention will be presented in the context of a magnetic sensor for use with magnetic media in a hard disk drive (HDD). However, those skilled in the art will realize that these aspects may be extended to any suitable application of a magnetic sensor. Accordingly, any reference to a magnetic sensor for use with an HDD is intended only to illustrate the various aspects of the present invention, with the understanding that such aspects may have a wide range of applications.

Aspects of a magnetic sensor include a composite layer comprising a free layer portion and a bias layer portion each comprising a magnetic material, a shield layer comprising a magnetic material and a continuous spacer layer comprising a non-magnetic material, the spacer layer separating the shield layer from the composite layer such that the magnetic coupling between the shield layer and the bias layer portion is stronger than the magnetic coupling between the shield layer and the free layer portion.

Aspects of a hard disk drive include a rotatable magnetic recording disk; and a slider including a magnetic sensor for use with the magnetic recording disk. The magnetic sensor includes a composite layer comprising a free layer portion and a bias layer portion each comprising a magnetic material, a shield layer comprising a magnetic material, and a continuous spacer layer comprising a non-magnetic material, the spacer layer separating the shield layer from the composite layer such that the magnetic coupling between the shield layer and the bias layer portion is stronger than the magnetic coupling between the shield layer and the free layer portion.

Aspects of a method of manufacturing a magnetic sensor include depositing a free layer portion comprising a magnetic material, depositing a bias layer portion comprising a magnetic material, thereby forming a composite layer comprising the free layer portion and the bias layer portion, depositing a continuous spacer layer comprising a non-magnetic material and depositing a shield layer comprising a magnetic material such that the spacer layer separates the shield layer from the composite layer. The magnetic coupling between the shield layer and the bias layer portion is stronger than the magnetic coupling between the shield layer and the free layer portion.

Figure 1:
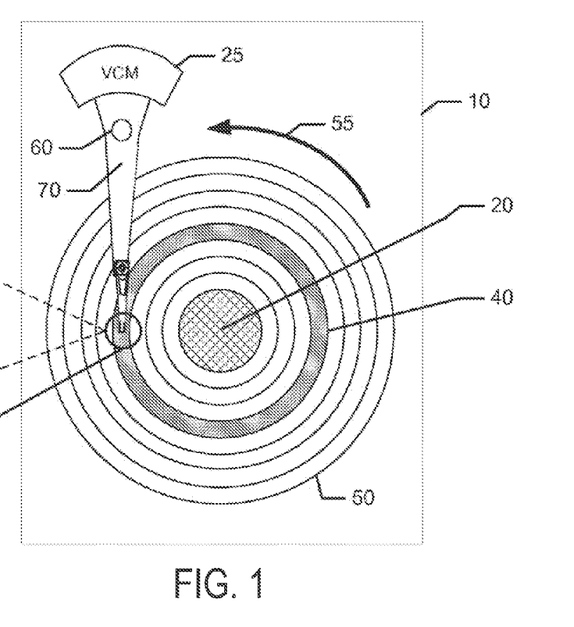
FIG. 1 is a top view of an exemplary embodiment of a disk drive.
Figure 1A:
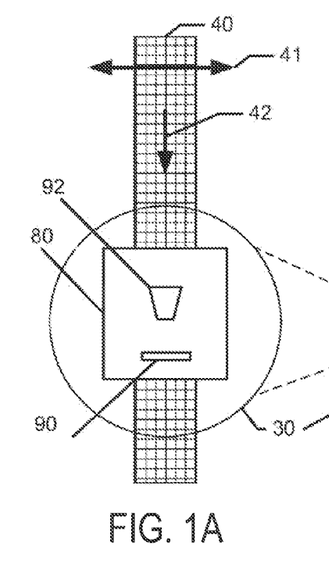
FIG. 1A is a more detailed view of an area shown in FIG. 1.
Figure 1B:
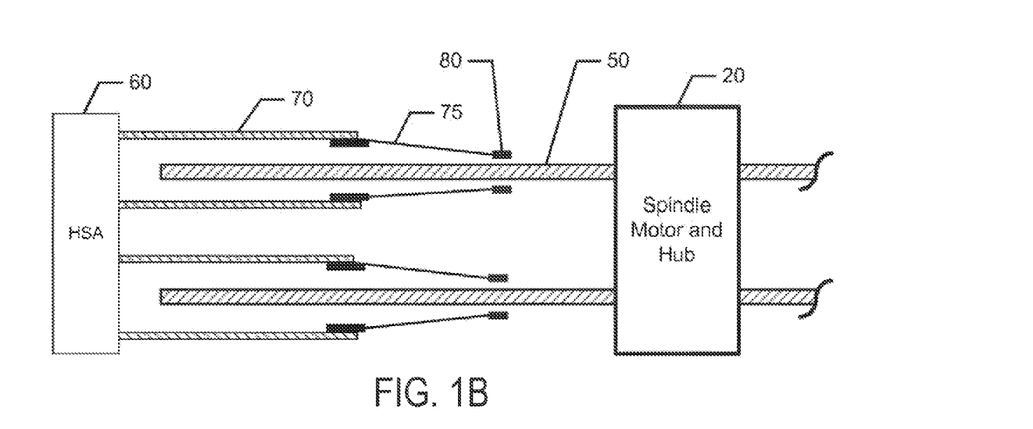
FIG. 1B is a side view of the exemplary embodiment of the disk drive in FIG. 1.

FIG. 1 illustrates a disk drive 10 used for data storage. FIGS. 1, 1A, and 1B are not drawn to scale and only certain structures are depicted for clarity. A disk media 50 is attached to spindle motor and hub 20. The spindle motor and hub 20 rotate the media 50 in a direction shown by arrow 55. A Head Stack assembly (HSA) 60 includes a magnetic recording head 30 on an actuator arm 70 and positions the actuator arm 70 by positioning the voice coil motor (VCM) 25 over a desired data track, shown as a recording track 40 in this example, to write data onto the media 50.

FIG. 1A illustrates an enlarged view of area 30 of FIG. 1. A magnetic sensor 90 is fabricated on slider 80. Slider 80 may be attached to suspension 75 and suspension 75 may be attached to actuator arm 70 as shown in FIG. 1B. Slider 80 may also incorporate a write transducer 92.

Referring again to FIG. 1A, slider 80 is illustrated above recording track 40. Media 50 and track 40 are moving under slider 80 in an in-track direction shown by arrow 42. The cross-track direction is shown by arrow 41.

FIG. 1B illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

Figure 2:
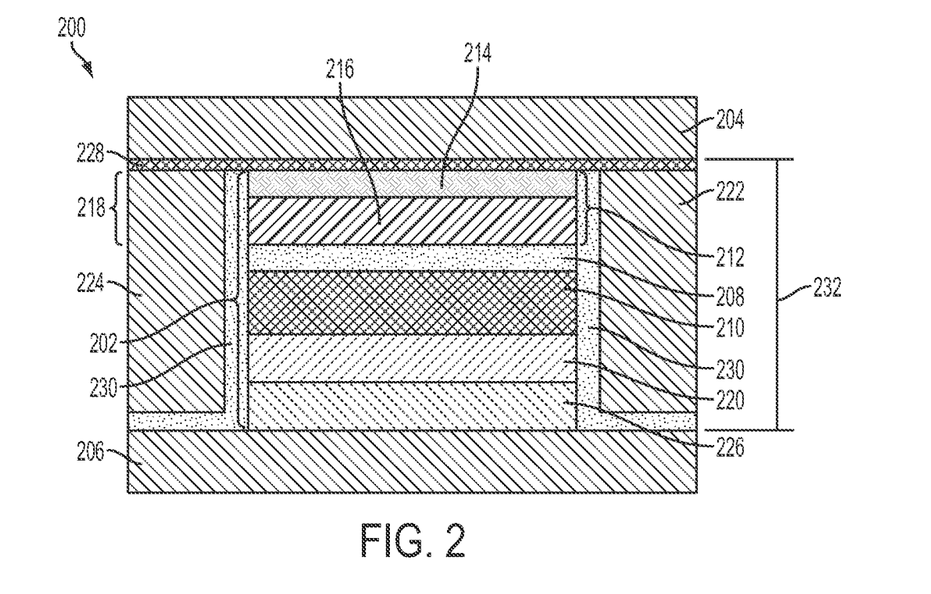
FIG. 2 is an ABS view of an exemplary embodiment of a magnetic read sensor.

FIG. 2 illustrates an ABS view of an exemplary embodiment of magnetic sensor 200 that is on slider 80 as shown in FIG. 1A. The ABS view is the view looking at the ABS from the viewpoint of the media surface. The sensor 200 includes a sensor stack 202 that is sandwiched between first and second, electrically conductive, magnetic shields 204, 206 that also function as electrically conductive leads. The magnetic shield material may comprise or consist of a NiFe alloy.

The sensor stack 202 may include a non-magnetic layer 208 that is sandwiched between a magnetic pinned layer structure 210 and a magnetic free layer structure 212. The non-magnetic layer 208 can be an electrically conductive material, if the sensor 200 is a Giant Magnetoresistive (GMR) sensor, and can be a thin electrically insulating material layer if the sensor structure 200 is a Tunnel Junction Sensor (TMR). In an exemplary embodiment, the free layer structure may be a single layer.

The pinned layer structure 210 can include first and second magnetic layers, with a non-magnetic, antiparallel coupling layer such as Ru sandwiched between the first and second magnetic layers. The first magnetic layer has its magnetization pinned in a first direction perpendicular to the ABS. This pinning is a result of exchange coupling with a layer of antiferromagnetic material 220 such as IrMn. The second magnetic layer has its magnetization pinned in a second direction that is antiparallel with the first direction as a result of antiparallel coupling between the first and second magnetic layers across the antiparallel coupling layer.

The magnetic free layer 212 has a magnetization that is biased in a direction that is generally parallel with the ABS, but that is free to move in response to a magnetic field. The biasing of the free layer is provided by a magnetostatic coupling with first and second soft bias layers 222, 224. The soft bias layer may comprise or consist of a soft magnetic layer, e.g., a NiFe alloy. The free layer structure may comprise a material suitable for magnetic coupling with the shield layer, which is discussed below.

The free layer structure 212 may comprise or consist of a single layer or multiple layers. In one example embodiment the free layer structure may comprise or consist of a single layer of one of CoFe alloy (including Fe), CoFeB alloy, or CoB alloy. In another example embodiment the free layer structure may comprise or consist of CoB with Ru lamination, such that the free layer comprises or consists of a trilayer structure of CoB alloy/Ru/CoB alloy. In the exemplary embodiment shown in FIGS. 2 and 3, the magnetic free layer 212 may include a first free layer 214 and a second free layer 216. In this exemplary embodiment, the first free layer 214 may comprise or consist of any of the above-listed free layer materials, while the second free layer 216 may comprise or consist of the same or different one of the above-listed free layer materials. However, the second free layer 216 may also comprise or consist of NiFe, which would not be suitable for the first free layer 214. One or more seed layers 226 may be provided at the bottom of the sensor stack 202 in order to ensure a desired grain growth of the other layers of the sensor stack 202 deposited thereon. The second free layer 216 may further comprise any number of multiple sublayers comprising the above-listed materials suitable for the second free layer e.

The portion the sensor 200 where the soft bias layers 222, 224 align with the free layer 212 is referred herein a composite layer 218. Thus, the composite layer 218 includes a soft bias portion 222, 224 and a free layer portion 212.

Figure 3:
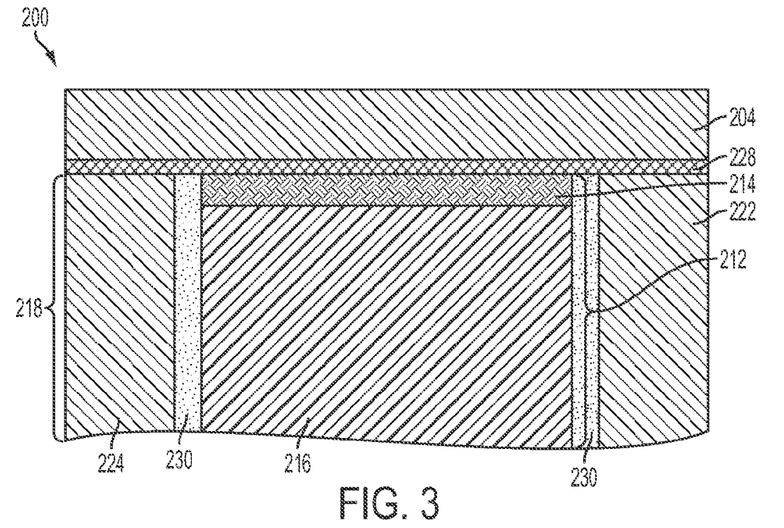
FIG. 3 is a partial ABS view of a portion of the exemplary embodiment of the magnetic read sensor of FIG. 2.

A spacer layer such 228 may be provided at the top of the sensor stack 202. As shown in FIGS. 2 and 3, the spacer layer 228 may be provided between the shield layer 204 and the composite layer 218. In particular, the spacer layer 228 may be provided between the shield layer 204 and the bias layer 224, between the shield layer 204 and the bias layer 222, and between the shield layer 204 and the free layer structure 212. The spacer 228 may be provided so that it lies directly between the above-noted layers, e.g., such that that the spacer 228 contacts shield layer 204, the bias layers 222, 224, and the free layer 212. In the example embodiment shown in FIGS. 1 and 2, the spacer 228 may be located between the shield layer 204 and the first free layer 224. For example the spacer layer 228 may contact the shield layer 204 and the first free layer 214, but not contact the second free layer 216.

The spacer layer 228 may be constructed of a non-magnetic, electrically conductive metal having a thickness sufficient to cause a difference in magnetic coupling between portions of the shield layer 204 and the composite layer 218. For example, the spacer layer may include a material and thickness such that the magnetic coupling between the shield layer 204 and the bias layers 222, 224 is relatively large as compared to the magnetic coupling between the shield layer 204 and the free layer structure 212. For example the spacer material may comprise or consist of a material selected from the group consisting of Ru, Cu, Cr, Au, and Ag. Preferably, the spacer layer 228 is comprise or consists of Ru. Example thicknesses include from about 1 to about 30 angstroms, more preferably from about 3 and about 20 angstroms, and still more preferably from about 5 to about 10 angstroms.

The tri-layering of shield 204 (e.g., NiFe)/spacer 228 (e.g. Ru)/bias layer 222, 224 (e.g. NiFe), when the spacer has the appropriate thickness will provide a relatively strong magnetic coupling between the shield 204 and the bias layers 222, 224. The tri-layering of shield 204 (e.g., NiFe)/spacer 228 (e.g. Ru)/free layer structure 212 (e.g. CoB), when the spacer has the appropriate thickness, will provide a relatively weak magnetic coupling between the shield 204 and the free layer structure 212. For example, in the exemplary embodiment shown in FIGS. 2 and 3, the spacer 228 may contact the first free layer 214, where the first free layer comprises one of the above-listed free layer materials that are suitable for resulting in relatively weak magnetic coupling when the spacer is provided between the shield layer 204 and the first free layer 214. That is, the selection of material for the shield layer 204, the soft bias layers 222, 224, the spacer 228, and the free layer structure 212, and the selection of the thickness of the spacer 228, provides for a relatively strong magnetic coupling between the shield layer 204 and the bias layer 222, 224, while also providing a relatively weak magnetic coupling between the shield layer 204 and the free layer structure 212. For example the materials of the above layers and thickness of the spacer layer may be chosen such that the strength of the magnetic coupling between the shield layer 204 and the bias layer 222, 224 is greater than about 0.5 erg/cm$^2$, more preferably greater than about 1.0 erg/cm$^2$, and the magnet coupling between the shield layer 204 and free layer structure 212 is less than about 0.1 erg/cm$^2$, more preferably less than about 0.01 erg/cm$^2$. In an exemplary embodiment the magnetic coupling may be Ruderman-Kittel-Kasuya-Yosida (RKKY) coupling. As noted above, because the second free layer 216 is separated from the spacer 228 via the first free layer 214, the second free layer may comprise or consist of NiFe without substantially interfering with the magnetic coupling of the shield 204/spacer 228/first free layer 214 tri-layer.

The sensor 200 may further comprise an insulating layer 230 between the soft bias layers 222, 224 and the free layer structure 218. The insulating layer 230 may thus comprise a material that electrically and magnetically decouples the bias layers 22, 224 from the free layer structure 281. For example, the insulating layer 230 may comprise or consist of alumina. As shown in FIG. 3, the insulating layer 230 may also be provided between the soft bias layers 222, 224 and the shield layer 206, as well as between the soft bias layers 222, 224 and all of the layers 208, 210, 220, 230.

As a result of the above structure, the shield-to-shield thickness 232 (i.e., the distance between the bottom of the first shield 204 and the top of the second shield 206) is typically about 20 nm to about 30 nm.

Figure 4:
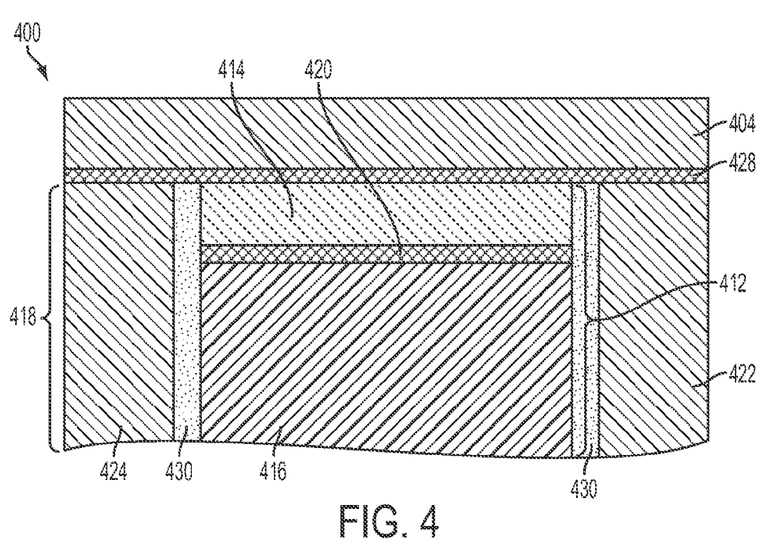
FIG. 4 is a partial ABS view of a portion of another exemplary embodiment of a magnetic read sensor.

FIG. 4 shows a partial ABS view of a portion of another exemplary embodiment of a magnetic read sensor 400. The layers not shown in FIG. 4 are arranged in the same manner as in the exemplary embodiment of FIG. 2, e.g., a nonmagnetic layer, pinned layer, antiferromagnetic material, seed, and a bottom layer. These layers are omitted for clarity.

As shown in FIG. 4, the sensor 400 includes a sensor stack (partially shown) that is sandwiched between first and second, electrically conductive, magnetic shields 404 (lower magnetic shield not shown) that also function as electrically conductive leads. The magnetic shield material may comprise or consist of a NiFe alloy.

Similar to the exemplary embodiment illustrated in FIG. 2, the sensor stack may include a non-magnetic layer that is sandwiched between a magnetic pinned layer structure (not shown) and a magnetic free layer structure 412. The non-magnetic layer may the same as above. The pinned layer may have the same structure and function as discussed above.

The magnetic free layer 412 has a magnetization that is biased in a direction that is generally parallel with the ABS, but that is free to move in response to a magnetic field. The biasing of the free layer is provided by a magnetostatic coupling with first and second soft bias layers 422, 424. The soft bias layer may comprise or consist of the same materials as discussed above. The free layer structure may comprise or consist of a material suitable for magnetic coupling with the shield layer, which is discussed below.

The free layer structure 412 may comprise or consist of a single layer or multiple layers. In the exemplary embodiment shown in FIG. 4, the free layer structure 412 may comprise or consist of a first free layer 414 and a second free layer 416 with a first spacer 420 separating the first free layer 414 from the second free layer 416. The material of the first free layer and the second free layer may be selected from the group consisting of CoFe alloy (including Fe), CoFeB alloy, or CoB alloy. The second free layer may also include NiFe alloy. The first free layer 414 materials may comprise the same or different materials as the second free layer 416. In one exemplary embodiment the second free layer 416 may comprise or consist of CoB with Ru lamination, such that the second free layer 416 comprises or consists of a trilayer structure of CoB alloy/Ru/CoB alloy. The first free layer 414 may also be referred to as a free layer sublayer. The free layer sublayer 414 has a thickness of about 10 angstroms to about 25 angstroms, more preferably about 15 to about 20 angstroms. The second free layer 416 may be about 70 angstroms thick. By having two separate free layers separated by the first spacer 420, the milling process, described below, only acts on the free layer sublayer 414 and not on the second free layer 416. This allows the second free layer 416 to properly maintain the desirable volume to function in the read process even if there is variation in the milling depth because there is no milling of the second free layer 416. Because the second free layer 416 is decoupled from the first free layer, the spacer, and the shield, the second free layer may also comprise or consist of NiFe without substantially interfering with the magnetic coupling of the shield 404/second spacer 428/free layer sublayer 414 tri-layer.

The first spacer 420 of the free layer structure 412 may be constructed of a non-magnetic, electrically conductive metal having a thickness sufficient to provide relatively small magnetic coupling between the first free layer 414 and second free layer 416. For example, the magnetic coupling may be is less than about 0.1 erg/cm$^2$, more preferably less than about 0.01 erg/cm$^2$. The spacer 420 material may comprise or consist of a material selected from the group consisting of Ta, Ru, Cu, Cr, Au, and Ag. Preferably, the spacer layer 420 comprises or consists of Ru. Example thicknesses include from about 1 to about 30 angstroms, more preferably from about 3 and about 20 angstroms, and still more preferably from about 5 to about 10 angstroms.

As with the exemplary embodiment shown in FIG. 2, one or more seed layers (not shown) may be provided at the bottom of the sensor stack.

The portion the sensor 400 where the soft bias layers 422, 424 align with the free layer 412 is referred herein a composite layer 418. Thus, the composite layer 418 includes a soft bias portion 422, 424 and a free layer portion 412.

A second spacer layer such 428 may be provided at the top of the sensor stack similar to the exemplary embodiment of FIG. 2. As shown in FIG. 4, the spacer layer 428 may be provided between the shield layer 404 and the composite layer 418. In particular, the spacer layer 428 may be provided between the shield layer 404 and the bias layer 424, between the shield layer 404 and the bias layer 422, and between the shield layer 404 and the first free layer 414. The spacer 428 may be provided so that it lies directly between the above-noted layers, e.g., such that that the spacer 228 contacts shield layer 204, the bias layers 222, 224, and the first free layer 414.

The second spacer layer 428 may be constructed of the same materials and have the same thickness range as discussed above with respect to the exemplary embodiment shown in FIG. 2. For example, the spacer layer may include a material and thickness such that the magnetic coupling between the shield layer 404 and the bias layers 422, 424 is relatively large as compared to the magnetic coupling between the shield layer 404 and the first free layer structure 412.

Similar to the exemplary embodiment shown in FIG. 2, the tri-layering of shield 404 (e.g., NiFe)/second spacer 428 (e.g. Ru)/bias layer 422,424 (e.g. NiFe), when the second spacer 428 has the appropriate thickness will provide a relatively strong magnetic coupling between the shield 404 and the bias layers 422, 424. The tri-layering of shield 404 (e.g., NiFe)/ second spacer 428 (e.g. Ru)/first free layer 214 (e.g. CoB), when the second spacer 420 has the appropriate thickness, will provide a relatively weak magnetic coupling between the shield 404 and the first layer structure 214. As above, the selection of material for the shield layer 404, the soft bias layers 422, 424, the second spacer 428, and the first free layer 214, and the selection of the thickness of the second spacer 428, provides for a relatively strong magnetic coupling between the shield layer 404 and the bias layer 422, 424, while also providing a relatively weak magnetic coupling between the shield layer 404 and the first free layer 412.

As shown in FIG. 4, the sensor 400 may similarly include an insulating layer 430 having the same material and function and location as discussed above with respect to the exemplary embodiment shown in FIGS. 2 and 3.

Figure 5A:
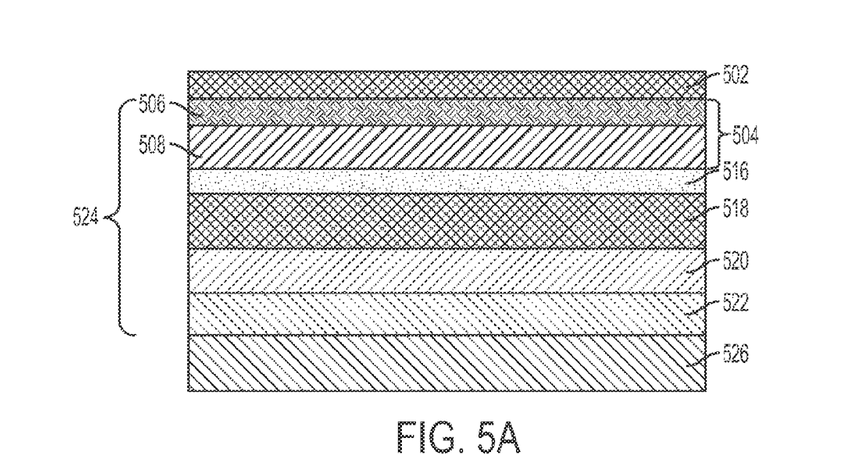
FIGS. 5A-5C are ABS views showing an exemplary method of manufacturing the exemplary embodiment of the magnetic read sensor of FIG. 2.
Figure 5B:
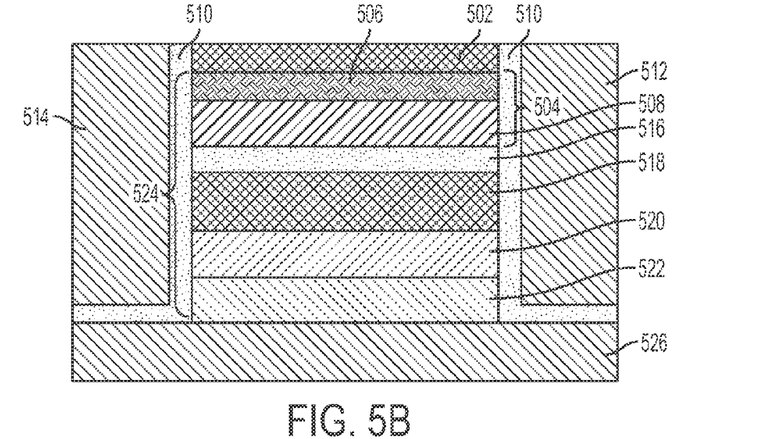
Figure 5C:
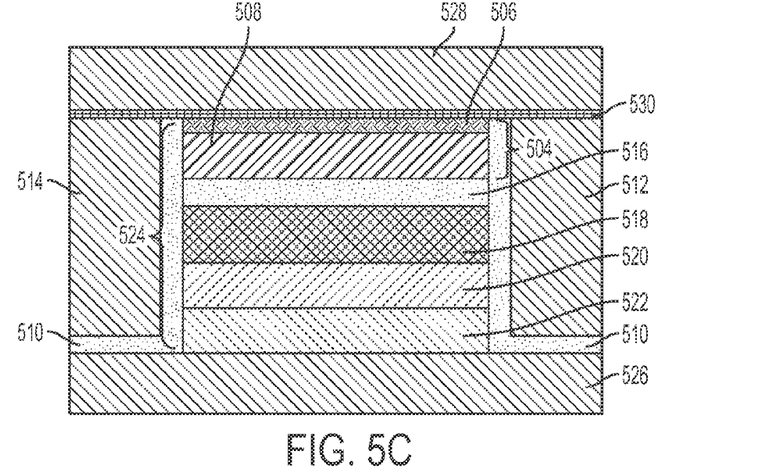

FIGS. 5A-5C are ABS views showing an exemplary method of manufacturing the magnetic read sensor 200. Turning to FIG. 5A, a capping layer 502, a sensor stack 524, and shield layer 536 are deposited. Depositing of the sensor stack 524 includes depositing a free layer structure 504, a nonmagnetic layer 516, a pinned layer 518, an antiferromagnetic material 520, and a seed layer 226. Depositing of the free layer structure 504 may include depositing a first free layer 506 (corresponding to first free layer 214 in FIG. 2) and a second free layer 508 (corresponding to second free layer 215 in FIG. 2). As noted above, the free layer structure may consist of a single layer of material or multiple layers. Each of the layers of the sensor stack 524 and the shield layer 536 may comprise the same material discussed above with respect to FIG. 2.

After the cap layer 502, the shield layer 526, and all of the layers of the sensor stack 524 have been deposited, milling is performed to remove portions of the sensor stack 524. Next, after the milling, insulating layers 510 are deposited such that the thickness of the insulating layers extend along the entire combined thickness of the sensor stack 524 and cap 502. Then, the soft bias layers 512, 514 are deposited, also extending along the entire sensor stack 524 and cap 502. As shown in FIG. 5B, the insulating layers 510 are between bias layers 512, 514 and the combined structure of the sensor stack 524 and the capping layer 502.

As shown in FIG. 5C, after the soft bias layers are deposited, the method may proceed to milling away the capping layer 502, a portion of the free layer structure 504 adjacent the capping layer 502, and a corresponding portion of the soft bias layers 512, 514 and insulating layers 510 that are aligned with the capping layer 502 and aligned with the portion of free layer structure 504. After the milling step, a spacer 530 may be deposited such that it extends across the soft bias layers 512, 514, the insulating layers 510, and the free layer structure 504. The spacer 530 corresponds to the spacer 228 of FIGS. 2 and 3 and the spacer 428 of FIG. 4, and may have the same composition and thickness as discussed above. After the spacer has been deposited, a shield layer 528 may be deposited across the spacer 530, thereby resulting in the structure shown in FIG. 2. The shield layer 528 corresponds to the shield layer 204 of FIGS. 2 and 3 and the shield layer 404 of FIG. 4, and has the same composition as discussed above.

The method for manufacturing the exemplary embodiment of the sensor 400 shown in FIG. 4 follows similar steps described above. When manufacturing the sensor 400, however, at the step of depositing the free layer structure of the sensor stack, there is an additional step of depositing a secondary spacer on top of a second free layer, and then depositing a first free layer onto secondary spacer. Then, when the milling step occurs, the milling is only performed on the first free layer. This allows the second free layer to properly maintain the desirable volume to function in the read process even if there is variation in the milling depth because there is no milling of the second free layer. The composition and thicknesses of the second free layer and the second spacer would be the same as discussed above with respect to the exemplary embodiment of FIG. 4.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A magnetic sensor comprising:
    a composite layer comprising a free layer portion and a bias layer portion surrounding opposing sides of the free layer portion, each of the free layer portion and the bias layer portion comprising a magnetic material;
    a first shield layer comprising a magnetic material;
    a second shield layer comprising a magnetic material;
    a seed layer between the second shield layer and the composite layer; and
    a continuous spacer layer comprising a non-magnetic material selected from the group consisting of Ru, Cu, Cr, Au, and Ag, the continuous spacer layer separating the first shield layer from the composite layer such that the magnetic coupling between the first shield layer and the bias layer portion is stronger than the magnetic coupling between the first shield layer and the free layer portion,
    wherein the continuous spacer layer is disposed between the first shield layer and the free layer portion,
    wherein the continuous spacer layer is disposed between the first shield layer and the bias layer portion, and
    wherein the continuous spacer layer contacts the free layer portion.

2. The magnetic sensor of claim 1, wherein the continuous spacer layer comprises a thickness of from about 1 to about 30 angstroms.

3. The magnetic sensor of claim 1, wherein the continuous spacer layer comprises a thickness of about 3 to about 20 angstroms or less.

4. The magnetic sensor of claim 1, wherein the continuous spacer layer comprises a thickness of about 5 to about 10 angstroms.

5. The magnetic sensor of claim 1, wherein the free layer portion comprises a first free layer and a second free layer, wherein the first free layer is located between the continuous spacer layer and the second free layer, and wherein the first free layer is selected from the group consisting of CoFe alloy or a CoFeB alloy.

6. The magnetic sensor of claim 1, wherein the magnetic coupling between the first shield layer and the free layer portion is less than about 0.01 erg/cm$^2$ and the magnetic coupling between the first shield layer and the bias layer portion is greater than about 0.5 erg/cm$^2$.

7. The magnetic sensor of claim 1, wherein the continuous spacer layer contacts the bias layer portion.

8. The magnetic sensor of claim 1, wherein the continuous spacer layer comprises a material that provides magnetic coupling between the first shield layer and the bias layer portion and magnetic coupling between the first shield layer and the free layer portion.

9. The magnetic sensor of claim 8, wherein the magnetic coupling comprises Ruderman-Kittel-Kasuya-Yosida (RKKY) coupling.

10. The magnetic sensor of claim 1, wherein the material of the free layer portion is a CoFe alloy or a CoFeB alloy.

11. The magnetic sensor of claim 10, wherein the free layer portion comprises elemental iron or a CoB alloy.

12. The magnetic sensor of claim 10, wherein the material of the bias layer portion comprises a NiFe alloy.

13. A disk drive comprising:
    a rotatable magnetic recording disk; and
    a slider including a magnetic sensor arranged with the magnetic recording disk, the magnetic sensor including:
        a composite layer comprising a free layer portion and a bias layer portion surrounding opposing sides of the free layer portion, each of the free layer portion and the bias layer portion comprising a magnetic material;
        a first shield layer comprising a magnetic material;
        a second shield layer comprising a magnetic material;
        a seed layer between the second shield layer and the composite layer; and
        a continuous spacer layer comprising a non-magnetic material selected from the group consisting of Ru, Cu, Cr, Au, and Ag, the continuous spacer layer separating the first shield layer from the composite layer such that the magnetic coupling between the first shield layer and the bias layer portion is stronger than the magnetic coupling between the first shield layer and the free layer portion,
    wherein the continuous spacer layer is disposed between the first shield layer and the free layer portion,
    wherein the continuous spacer layer is disposed between the first shield layer and the bias layer portion, and
    wherein the continuous spacer layer contacts the free layer portion.

14. The disk drive of claim 13, wherein the continuous spacer layer comprises a thickness of from about 1 to about 30 angstroms.

15. The disk drive of claim 13, wherein the continuous spacer layer comprises a thickness of about 3 to about 20 angstroms or less.

16. The disk drive of claim 13, wherein the continuous spacer layer comprises a thickness of about 5 to about 10 angstroms.

17. The disk drive of claim 13, wherein the free layer portion comprises a first free layer and a second free layer, wherein the first free layer is located between the continuous spacer layer and the second free layer, and wherein the first free layer is selected from the group consisting of CoFe alloy or a CoFeB alloy.

18. The disk drive of claim 13, wherein the magnetic coupling between the first shield layer and the free layer portion is less than about 0.01 erg/cm$^2$ and the magnetic coupling between the first shield layer and the bias layer portion is greater than about 0.5 erg/cm$^2$.

19. The disk drive of claim 13, wherein the continuous spacer layer contacts the bias layer portion.

20. The disk drive of claim 13, wherein the continuous spacer layer comprises a material that provides magnetic coupling between the first shield layer and the bias layer portion and magnetic coupling between the first shield layer and the free layer portion.

21. The disk drive of claim 20, wherein the magnetic coupling comprises Ruderman-Kittel-Kasuya-Yosida (RKKY) coupling.

22. The disk drive of claim 13, wherein the material of the free layer portion is a CoFe alloy or a CoFeB alloy.

23. The disk drive of claim 22, wherein the free layer portion comprises elemental iron or a CoB alloy.

24. The disk drive of claim 22, wherein the material of the bias layer portion comprises a NiFe alloy.

25. A method of manufacturing a magnetic sensor, the method comprising:
- depositing a first shield layer comprising a magnetic material;
- depositing a seed layer;
- depositing a free layer portion comprising a magnetic material, such that the seed layer is disposed between the first shield layer and the free layer portion;
- depositing a bias layer portion comprising a magnetic material such that the bias layer portion surrounds opposing sides of the free layer portion, thereby forming a composite layer comprising the free layer portion and the bias layer portion;
- depositing a continuous spacer layer comprising a non-magnetic material selected from the group consisting of Ru, Cu, Cr, Au, and Ag; and
- depositing a second shield layer comprising a magnetic material such that the continuous spacer layer separates the second shield layer from the composite layer,
- wherein the magnetic coupling between the second shield layer and the bias layer portion is stronger than the magnetic coupling between the second shield layer and the free layer portion,
- wherein the continuous spacer layer is disposed between the second shield layer and the free layer portion,
- wherein the continuous spacer layer is disposed between the second shield layer and the bias layer portion, and
- wherein the continuous spacer layer contacts the free layer portion.

26. The method of claim 25, further comprising milling a portion of the free layer portion prior to depositing the bias layer portion.

27. The method of claim 25, wherein the continuous spacer layer comprises a thickness of from about 1 to about 30 angstroms.

28. The method of claim 25, wherein the continuous spacer layer contacts the bias layer portion.

29. The method of claim 25, wherein the continuous spacer layer comprises a material that provides magnetic coupling between the second shield layer and the bias layer portion and magnetic coupling between the second shield layer and the free layer portion.

30. The method of claim 29, wherein the magnetic coupling is Ruderman-Kittel-Kasuya-Yosida (RKKY) coupling.

* * * * *